United States Patent [19]
Ross

[11] Patent Number: 5,553,933
[45] Date of Patent: Sep. 10, 1996

[54] SAFETY GLOVE BAG AND METHOD OF MAKING SAME

[75] Inventor: Kurt D. Ross, Atlanta, Ga.

[73] Assignee: Grayling Industries, Inc., Alpharetta, Ga.

[21] Appl. No.: 293,187

[22] Filed: Aug. 19, 1994

[51] Int. Cl.⁶ .................................................. B08B 15/00
[52] U.S. Cl. ........................................ 312/1; 134/201
[58] Field of Search .......................... 312/1, 3, 4, 5, 312/6; 134/201

[56] References Cited

U.S. PATENT DOCUMENTS

| | | | |
|---|---|---|---|
| 2,797,530 | 7/1957 | Garver | 312/1 X |
| 3,396,701 | 1/1968 | Trexler | 119/15 |
| 4,089,571 | 5/1978 | Landy | 312/1 |
| 4,604,111 | 8/1986 | Natale | 55/97 |
| 4,626,291 | 12/1986 | Natale | 134/21 |
| 4,783,129 | 11/1988 | Jacobson | 312/1 |
| 4,812,700 | 5/1989 | Natale | 312/1 |
| 4,883,329 | 11/1989 | Flannery et al. | 312/1 |
| 4,901,743 | 2/1990 | Hittler | 134/172 |
| 4,912,358 | 3/1990 | Vitta | 312/1 |
| 4,934,763 | 6/1990 | Jacobson | 312/1 |
| 5,147,242 | 9/1992 | Lowe, Jr. | 312/1 X |
| 5,342,121 | 8/1994 | Koria | 312/1 |

FOREIGN PATENT DOCUMENTS

| | | | |
|---|---|---|---|
| 32852/84 | 3/1986 | Australia . | |
| 1188191 | 6/1985 | Canada | 16/2 |
| 552090 | 11/1956 | Italy . | |
| 2157822 | 10/1985 | United Kingdom . | |
| 86/00065 | 9/1986 | WIPO . | |

*Primary Examiner*—James R. Brittain
*Assistant Examiner*—Janet M. Wilkens
*Attorney, Agent, or Firm*—Kennedy & Kennedy

[57] ABSTRACT

Apparatus for use in removing hazardous material from an elongated pipe has an upper work section comprised of a sheet of flexible material having a centrally located opening and a lower debris collection and disposal bag that depends from the upper work section about the opening. Gloves are mounted to the upper work section sheet. So constructed, upon wrapping and securing the upper work section about a pipe with opposite ends thereof drawn upwardly thereto aside the opening, the work section is configured into the shape of a funnel for funneling debris worked from the pipe down into the debris collection and disposal bag.

7 Claims, 5 Drawing Sheets

SAFETY GLOVE BAG AND METHOD OF MAKING SAME

TECHNICAL FIELD

This invention relates generally to safety glove bags, and particularly to safety glove bags of the type used to remove hazardous material from a pipe, and to methods of producing such glove bags.

BACKGROUND OF THE INVENTION

Before the hazardous nature of asbestos was fully appreciated, asbestos was widely used to insulate pipes in buildings. It is of course now realized that exposure to asbestos, and particularly to airborne asbestos fibers and dust, creates a significant health hazard. The awareness of the dangers inherent in the presence of asbestos has led to the removal of asbestos insulation, even when undamaged. As an example, quite often a potential purchaser of a building or house will require removal of all asbestos before consummating the purchase. Both federal and state laws require extraordinary protection for workers engaged in the removal of asbestos containing materials. To afford such protection without seriously hampering the work effort, several devices and systems have been used.

Today glove bags are widely used in safely removing asbestos insulation form pipes. One of the first such glove bags was that one known as the Asbebag which is described in United Kingdom Patent No. 1,567,270 and Canadian Patent No. 1,188,191. It was made of two sheets of transparent plastic material with side gussets and welded seams. The top of the bag had front and back flaps that were placed about a length of insulated pipe and held together with a sliding clasp fastener. These flaps extended laterally from the main body of the bag to provide extensions that were secured to sections of the pipe that straddle the section to be stripped. Mittens extended into the interior of the bag. Mating Velcro strips and covering plastic flaps were provided to seal off a bottom portion of the bag after the pipe has been cleaned and the stripped debris or lagging has been collected therein. A second generation Asbebag of Petro Zarkos shown in United Kingdom Patent Application No. 2,157,822A, was of similar shape, both being the shape such like that of a T-shirt formed with two sheets of plastic welded together at their edges.

Another, design glove bag of Natale is shown in U.S. Pat. No. 4,626,291. It is made of a length of polyethylene lay-flat tubing with a sealed bottom and open top flaps that are wrapped about a pipe.

More recently the asbestos abatement industry has adopted glove bags of a design that has a number of individual debris collection chambers or pouches that depend downwardly from an elongated upper section or manifold that is wrapped about a pipe. Such a bag is shown in U.S. Pat. No. 4,901,743 of Hittler and is referred to as an extended run safety glove bag. This type glove bag has the advantage of enabling a long section of pipe to be stripped of insulation with a single bag where, otherwise, several bags would have to be individually mounted or a single bag mounted and remounted a number of times along successive portions of the pipe section.

Though the foregoing glove bags have been commercially successful, their specially designed shapes have resulted in substantial waste of plastic material and other manufacturing inefficiencies. And though the Natale design is simple, being made from a length of lay flat tubing without lateral flaps or sleeves, it has been difficult to bunch and seal to pipe lagging. Its bottom seal has also been susceptible to breaching when loaded with stripped lagging and water used in the stripping process.

It thus is seen that a need remains for a safety glove bag for use in removing hazardous material from a pipe of simplified construction and manufacturing efficiency. Accordingly, it is to the provision of such that the present invention is primarily directed.

SUMMARY OF THE INVENTION

In a preferred form of the invention an apparatus for use in removing hazardous material from an elongated pipe has an upper work section comprised of a generally rectangular sheet of flexible material that has a centrally located opening. A lower debris collection and disposal bag depends from the upper work section about the opening. Gloves are also mounted to the upper work section. By wrapping and securing the upper work section about a pipe with opposite ends thereof drawn upwardly thereto aside the opening, the work section is configured into the shape of a funnel for funneling debris worked from the pipe down into the debris collecting and disposal bag.

Alternatively, several openings are formed in a row in the rectangular sheet about which several debris collection and disposal bags depend. Support means are provided for supporting the upper portion to shape it into a row of in tandem funnels for funneling debris into the bags.

The apparatus is made by cutting one or more holes in a generally rectangular sheet of flexible material such as plastic, mounting gloves to the sheet, and mounting bags to the sheet about the holes.

DETAILED DESCRIPTION

Figure 1:
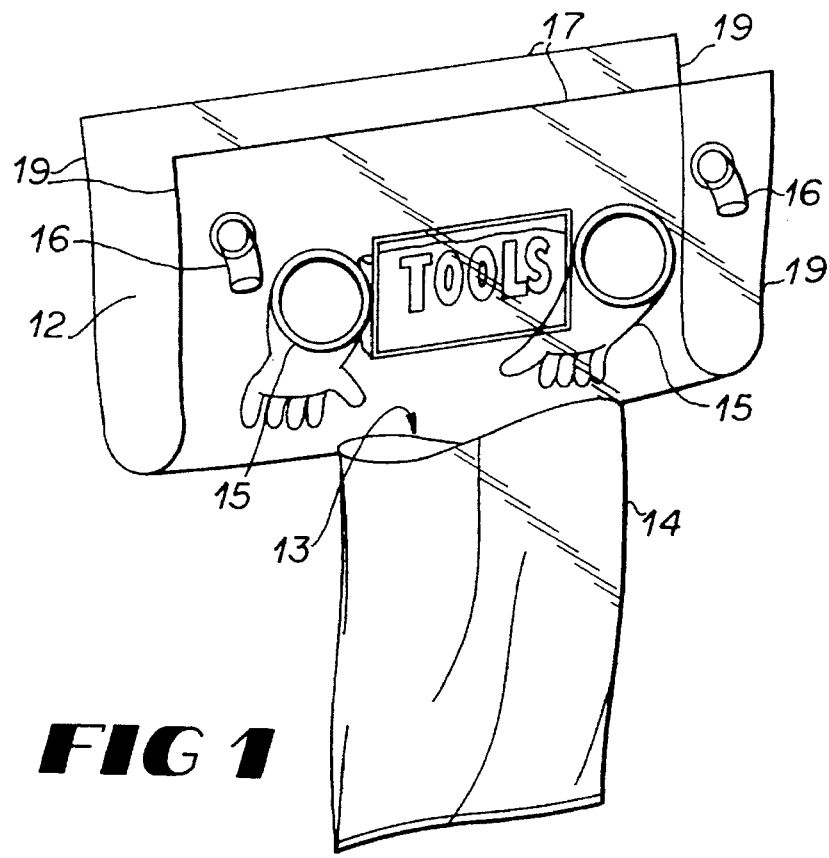
FIG. 1 is a perspective view of apparatus of the invention in a preferred form shown configured for mounting to a pipe.

Referring now in more detail to the drawing, there is shown in FIGS. 1–4 an apparatus for removing hazardous, asbestos insulation or lagging from a pipe which comprises a rectangular sheet of flexible, transparent, plastic material 12 shown folded into a U-shaped trough preparatory to being mounted to a pipe. The sheet 12 has a centrally-located cut-out hole 13 about the periphery of which is heat sealed an open end of a transparent, plastic, debris collection and disposal bag 14. Alternatively the hole 13 may be to one side to facilitate receipt of intact elongated sections of lagging. A pair of gloves 15 is heat sealed to the sheet 12 above the hole 13 as is a tool pouch and access ports 16 for sealingly receiving water hoses and vacuum lines.

Figure 2:
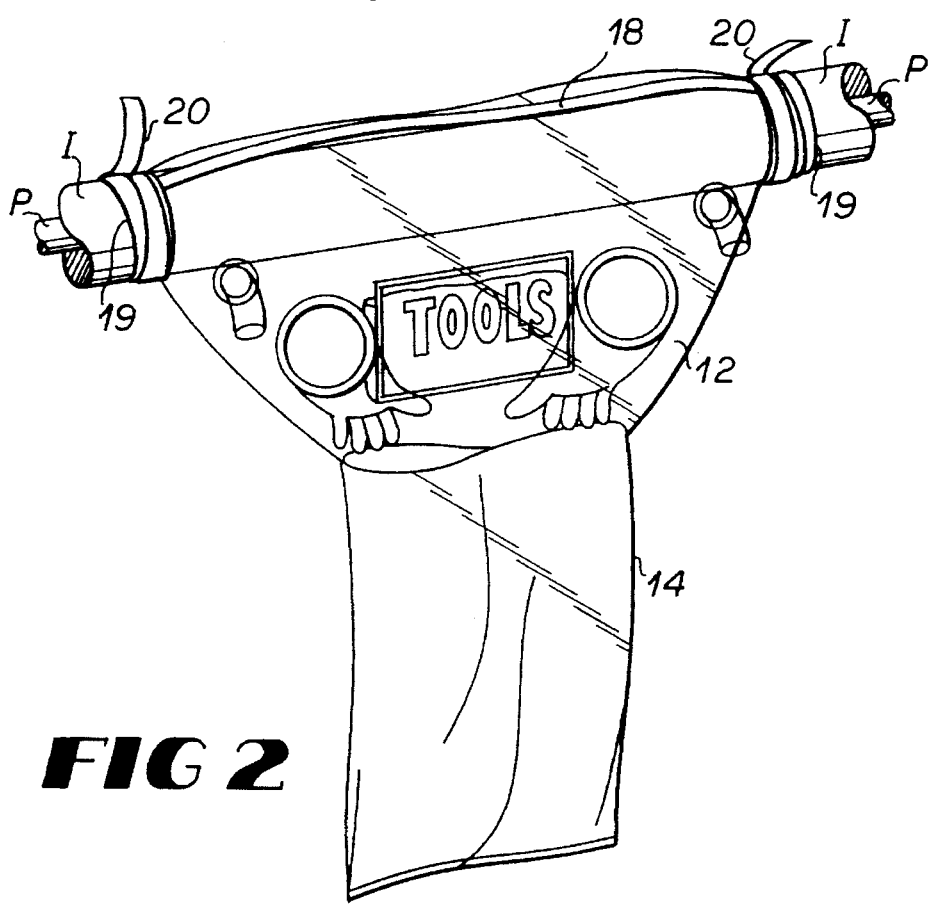
FIG. 2 is a perspective view of the apparatus of FIG. 1 shown mounted to a pipe preparatory to stripping.

With reference to both FIGS. 1 and 2, the apparatus is mounted to a pipe P covered with a layer of insulation or lagging I that is to be stripped. To do this the upper, opposed edges 17 of the sheet are looped over the top of the insulated pipe and sealed together with a length of tape 18. The two opposed side edges 19 are then drawn upwardly, snugly about the insulated pipe and sealed thereto with strips of tape 20. This results in the sheet 12 now being configured into the shape of a funnel as shown in FIG. 2. The apparatus is now ready for use in manually stripping the section of pipe located therein with the sheet 12 now providing an upper work section of the apparatus and the bag providing a lower debris collection and disposal section.

Figure 3:
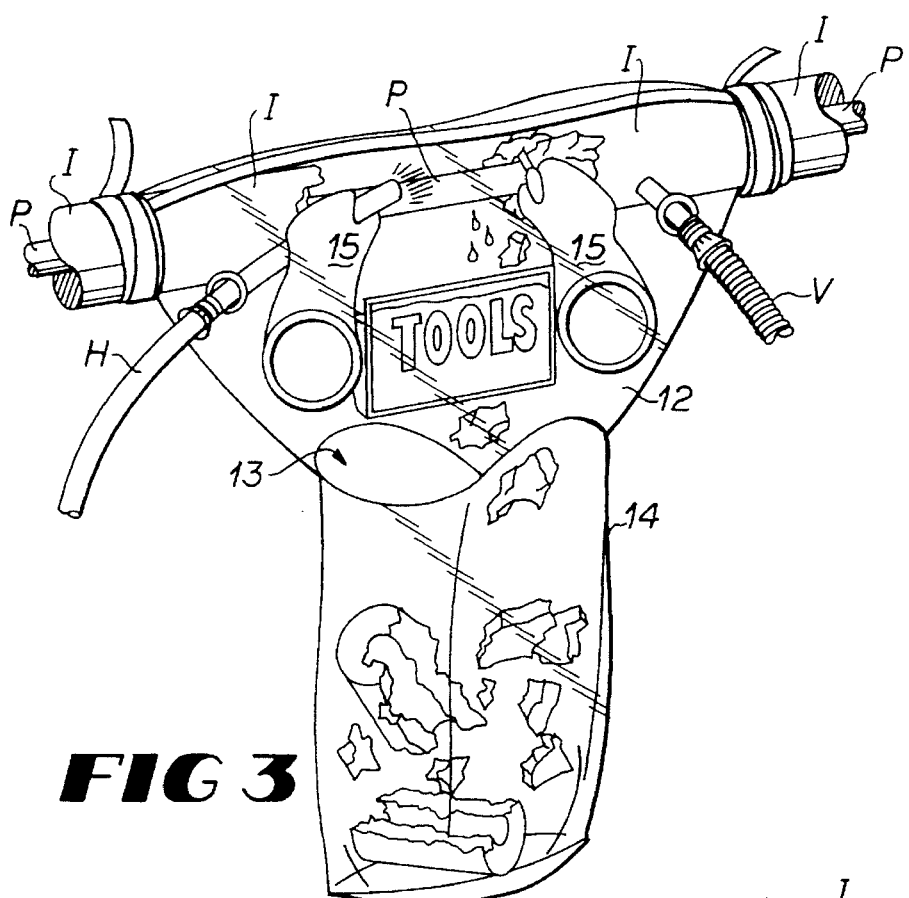
FIG. 3 is a perspective view of the apparatus of FIGS. 1 and 2 shown with the pipe being stripped of insulation.
Figure 4:
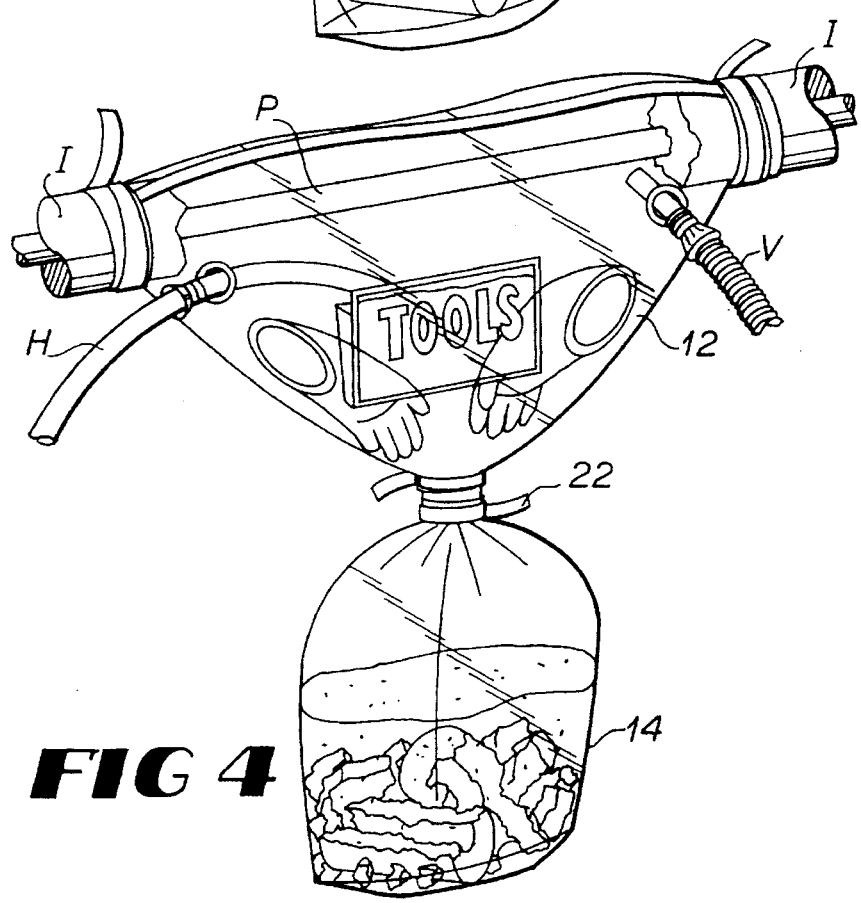
FIG. 4 is a view of the apparatus of FIGS. 1–3 following completion of the stripping operation and with its debris collection and disposal bag tied off.
Figure 5:
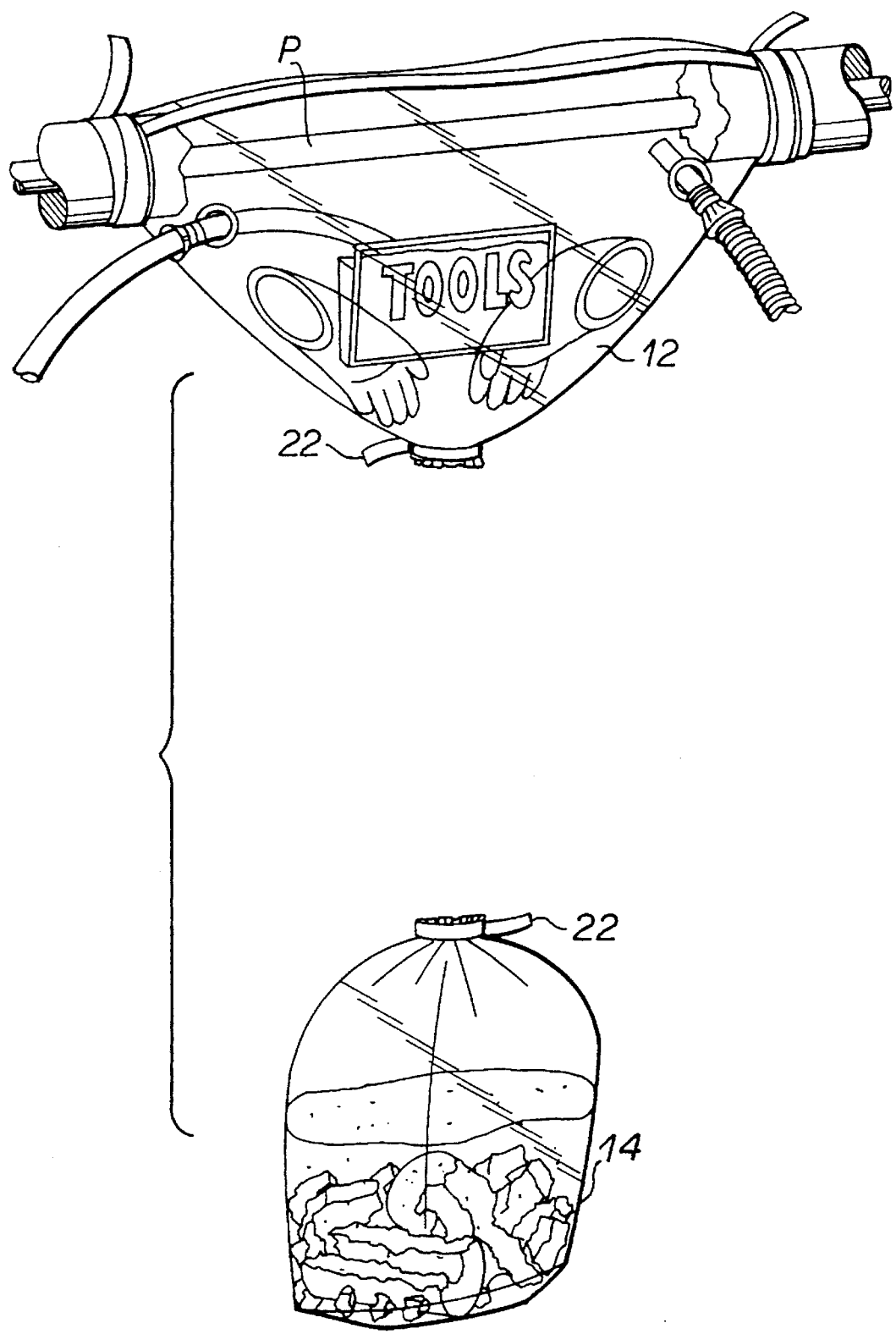
FIG. 5 is a perspective view of the apparatus of FIGS. 1–4 with the bag separated from the remainder of the apparatus.
Figure 6:
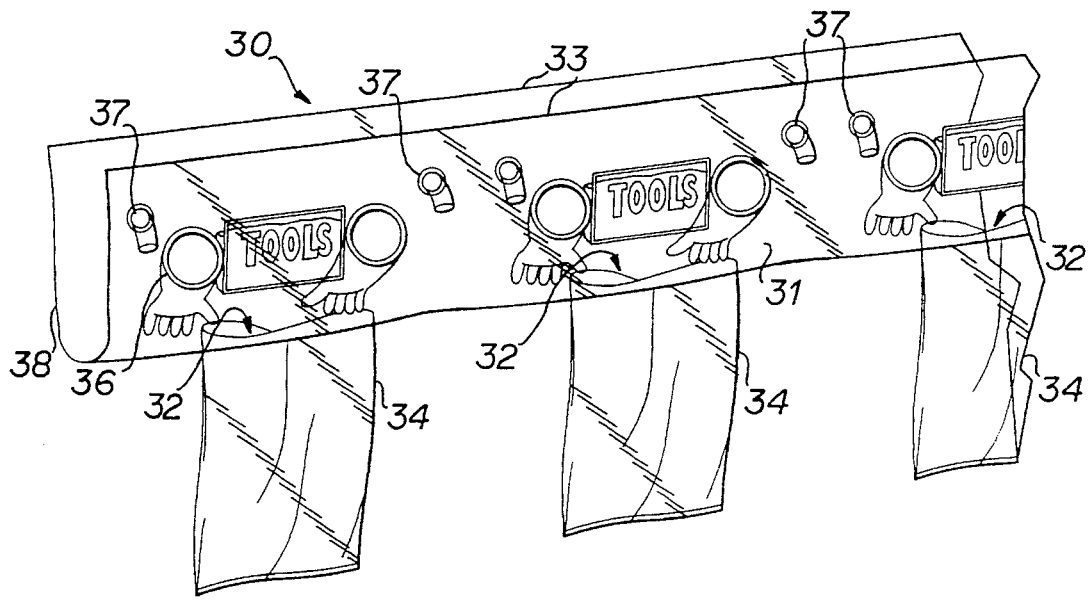
FIG. 6 is a perspective view of another preferred embodiment of the invention shown configured for mounting to a pipe.

In FIG. 3 the apparatus is shown while the pipe P is being stripped of its insulation I. With an operator's unshown hands inserted in the gloves 15 his right hand here cuts away the insulation while his left hand aims a water hose H at the pipe while a vacuum is applied via vacuum line V. As this is done pieces of stripped insulation or lagging are washed down the funnel-shaped upper section and into the debris collection and disposal bag 14. Finally, as shown in FIGS. 4 and 5, the top of the bag is tightly bundled closed and secured tightly with a wrap of tape 22 and then severed free from the upper section. The upper work section is then removed.

With reference next to FIGS. 6–9 another preferred form of the invention is shown as an extended run type glove bag. Here the apparatus 30 is seen to comprise an elongated, rectangular sheet of flexible, transparent, plastic material 31, although an end portion is shown cut away in each figure for simplicity and clarity of illustration. A series or row of holes 32 is cut in the sheet midway between its elongated side edges 33, spaced from the sheet ends 38. Again, debris collection and disposal bags 34 of transparent, plastic construction are heat sealed, in tandem, to the sheet 31 about the holes 32. Gloves 36, a tool pouch and access ports 37 are mounted to the sheet 31 above each hole 32.

Figure 7:
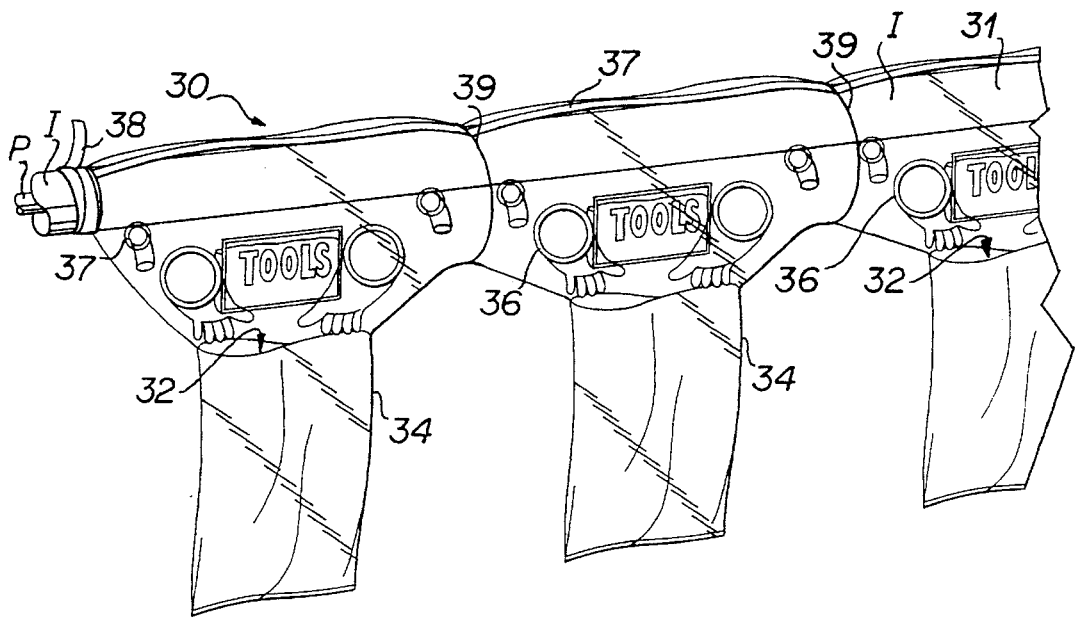
FIG. 7 is a perspective view of the apparatus of FIG. 6 shown mounted to a pipe preparatory to stripping.
Figure 8:
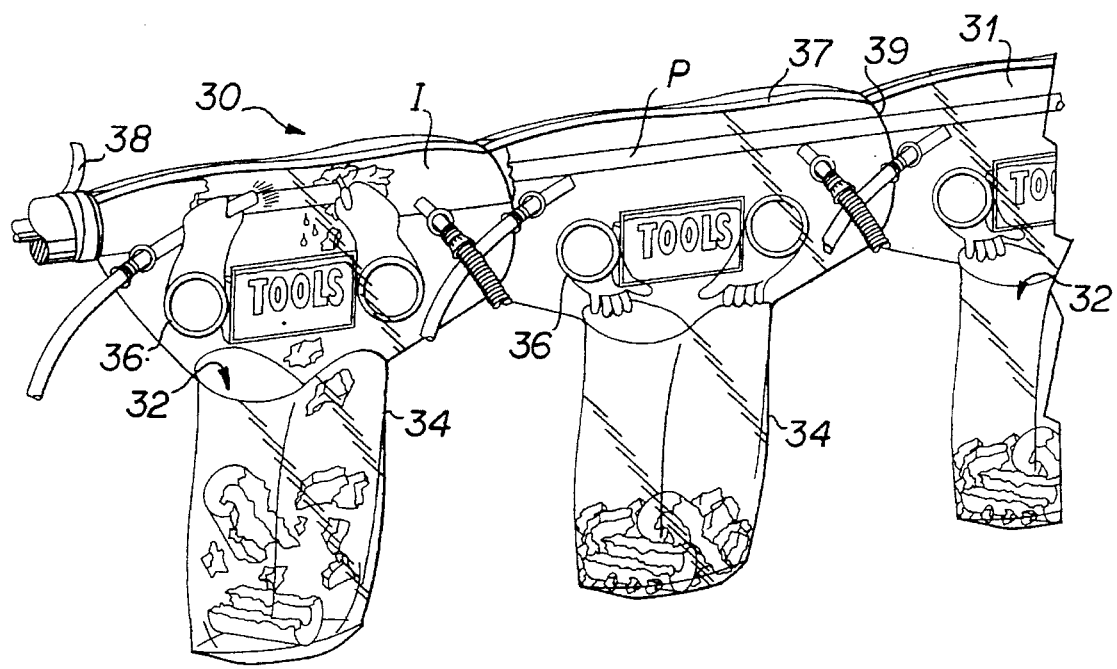
FIG. 8 is a perspective view of the apparatus of FIGS. 6–7 shown with the pipe being stripped of insulation.
Figure 9:
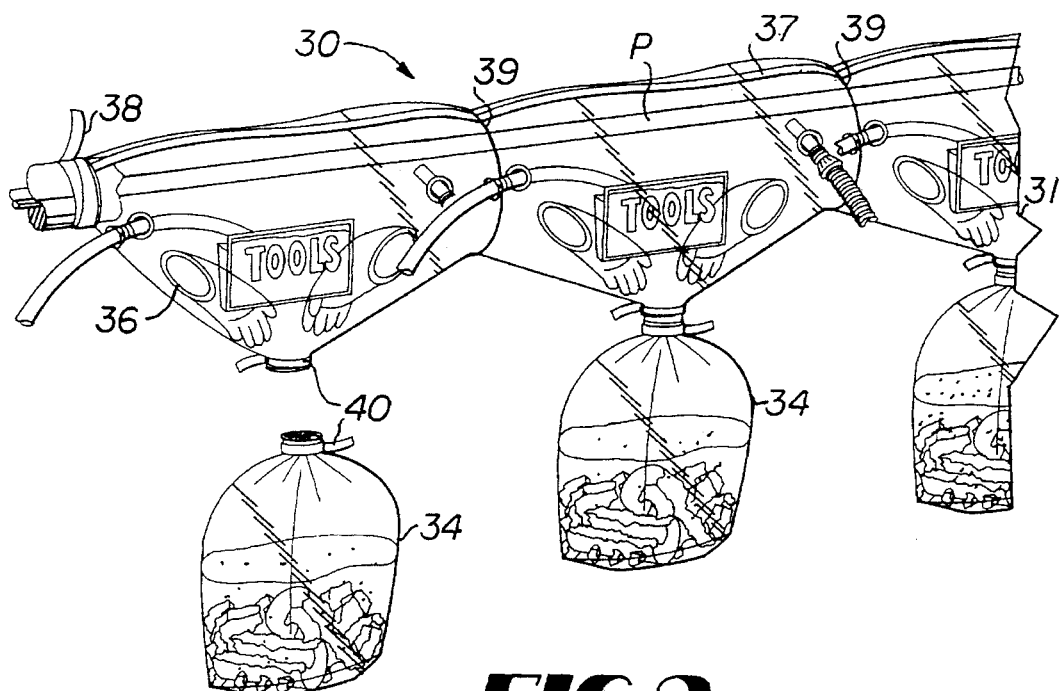
FIG. 9 is a perspective view of the apparatus of FIGS. 6–8 with its disposal bags filled and tied off and in the process of being separated.

The apparatus 30 is mounted to a pipe P with jacketed insulation I as shown in FIG. 7 by bringing together elongated edges 33 of the sheet 31 above the pipe and sealing them together with tape 37. The relatively short ends 38 of the sheet 31 are sealed to the insulation I with tape 38. Tie lines 39 are then tied about the sheet 31 midway between adjacent holes 32 of lengths that are sufficiently short to elevate the bottom of the sheet between the holes above the holes but which are sufficiently long so that there is still substantial space between the sheet and insulated pipe all along the interior of the apparatus. In this manner the entire section of the pipe within the apparatus is accessible for stripping. Also, with the opposite ends of the sheet drawn and sealed to the insulation and with intermediate bottom portions of the sheet drawn upwardly aside the holes 32, the sheet assumes the shape of an array of in tandem funnels as shown in FIG. 7.

With the apparatus mounted to the insulated pipe as shown in FIG. 7, the insulation I may be stripped from the entire section of the Pipe P that is inside the apparatus 30. This is shown being completed in FIG. 8. The stripped lagging and water used to do this are funnelled from the upper work section of the apparatus above the holes 32 into the debris collection and storage bags 34. The bags are then sealed with tape 40 and cut free from the sheet as shown being done in FIG. 9. The remaining upper work portion of the apparatus may then be removed.

Though the use of tie lines 39 is preferred in shaping the extended run version into a series of funnels, such may also be done by gathering or bunching the sheet in these areas and then applying the tape 37. If desired, the sheet 31 can have serrated or undulating edges 33 that are brought together and taped to reduce bulk created by the avoid the gathering and bunching in those areas above the pipe.

It thus is seen that apparatuses for removing hazardous material from a pipe are now provided of very simple and economic construction and which may be used in a highly efficient manner. It should however be understood that the two embodiments just described merely illustrate principles of the invention in its preferred forms and that many modifications may be made thereto without departure from the spirit and scope of the invention as set forth in the following claims.

I claim:

1. Apparatus for use in removing hazardous material from an elongated pipe, said apparatus having an upper work section comprised of a sheet of flexible material of generally rectangular shape and having a generally centrally located opening, a lower debris collection and disposal bag that depends from said upper work section about said opening, and gloves mounted to said upper work section, whereby upon wrapping and securing the upper work section about a pipe with opposite ends thereof drawn upwardly thereto aside the opening the work section is configured into the shape of a funnel for funneling debris worked from the pipe down into the debris collection and disposal bag.

2. The apparatus of claim 1 wherein said debris collection and disposal bag is made of flexible material.

3. Apparatus for use in removing hazardous material from an elongated pipe, said apparatus having an upper work portion comprised of an elongated sheet of flexible material having opposed side edges and having a plurality of openings in a row in said sheet located generally midway between said opposed side edges; and a lower debris collection and disposal portion comprised of a plurality of bags that depend from said upper portion about said openings; support means for supporting said upper work portion from a pipe and elevating said upper work portion above said openings to configure said upper portion into the shape of a plurality of funnels, and a plurality of gloves mounted to said upper work portion above said openings.

4. The apparatus of claim 3 wherein said elongated sheet is substantially rectangular.

5. The apparatus of claim 3 wherein said bags are made of flexible material.

6. The apparatus of claim 3 wherein said support means comprises a tie line of a length sufficient to be looped loosely about the pipe.

7. The apparatus of claim 3 wherein said support means comprises a length of tape adopted to be placed on said elongated sheet about the pipe.

* * * * *